United States Patent [19]

Minicozzi

[11] 4,212,568
[45] Jul. 15, 1980

[54] CUTTING TOOL

[75] Inventor: Alfonso Minicozzi, Anjou, Canada

[73] Assignee: IMW Industries, Inc., Montreal, Canada

[21] Appl. No.: 24,037

[22] Filed: Mar. 26, 1979

[30] Foreign Application Priority Data

Jan. 5, 1979 [CA] Canada ................................. 319210

[51] Int. Cl.² ............................................. B26D 1/12
[52] U.S. Cl. ......................................... 407/53; 407/63
[58] Field of Search ...................... 407/53, 54, 55, 56, 407/59, 60, 61, 62, 63

[56] References Cited

U.S. PATENT DOCUMENTS

| Re. 26,544 | 3/1969 | Castor, Sr. | 407/53 |
| 1,840,852 | 1/1932 | Schotthoefer | 407/61 |
| 1,963,611 | 6/1934 | Brumell et al. | 407/54 |
| 3,133,339 | 5/1964 | Ribich | 407/54 |
| 3,548,476 | 12/1970 | Cave et al. | 407/54 |
| 3,775,819 | 12/1973 | Ribich | 407/53 |

Primary Examiner—Harrison L. Hinson
Attorney, Agent, or Firm—Wenderoth, Lind & Ponack

[57] ABSTRACT

A rotary cutting tool blank comprises a cutting portion having a longitudinal axis and a plurality of teeth extending the length of said cutting portion, with each of the teeth having a cutting face and a trailing face and a land surface bridging the cutting and trailing faces. The land surfaces are interrupted by a plurality of spaced transverse depressions of relatively large radius arcuate cross section to form a plurality of cutting edge portions at the junction of the cutting face and the uninterrupted portions of the land surface. The cutting edge portions have a positive rake angle, and the trailing and cutting faces of each tooth have surfaces which undulate generally sinusoidally from one end of the cutting portion to the other so that the rake angle of each cutting edge portion varies continuously along its length. The cutting tool blank can be transformed to a cutting tool ready for use simply by suitably relieving the land surfaces to form cutting edges at the aforementioned cutting edge portions.

12 Claims, 6 Drawing Figures

CUTTING TOOL

BACKGROUND OF THE INVENTION

This invention relates to rotary cutting tools, and, while not so limited, is particularly suited to use with milling cutters.

For illustrative purposes, this specification will describe the invention as it pertains to a conventional end mill, i.e., a milling cutter of cylindrical configuration having a shank portion and a cutting portion, the cutting portion containing a plurality of helically disposed teeth extending from the shank end of the cutting portion to the free end thereof. In such a milling cutter the cutting edges of the teeth lie on a substantially constant radius with respect to the longitudinal axis of the tool. However, the invention may also have application to taper end mills wherein the cutting portion is generally frusto-conical in form, and the cutting edge of each tooth has a constantly decreasing radius with respect to the longitudinal axis of the tool as the edge extends from the shank end of the cutting portion to the free end or print, although even in such tapered end mill, the cutting edges of the teeth are at the same radius from the longitudinal axis of the tool in any plane through the cutting portion and perpendicular to the longitudinal axis of the tool. The invention also has application to so-called "straight fluted" end mills wherein the teeth extend parallel to the longitudinal axis of the tool, as opposed to helically with respect thereto, and of course the invention may also be utilized with other forms of rotary cutting tools which are not properly categorized as end mills or milling cutters generally.

There are several problems inherent in the use of the conventional milling cutter as described above. Generally speaking, these problems manifest themselves in excessive wear and relatively poor cutting action, or both, owing to the fact that the entire length of a cutting edge may be applied to the work piece at the same time, and owing to the fact that continuous chips are produced which are not satisfactorily removed from the work area. There have been many attempts made to improve the cutting action and decrease the wear in such tools, and these attempts usually involve the use of so-called "chip breakers" in the form of relatively deep notches cut transversely into the teeth at spaced intervals, or some other similar means of providing an interrupted cutting edge along each tooth. One form of such "chip breaker" is described in the Erhardt U.S. Pat. No. 2,855,657 dated Oct. 14, 1958. These attempted solutions to the aforementioned problems have met with some success in improving tool life and in facilitating chip removal from the work area, although such success is due primarily to the fact that smaller, discontinuous chips are produced which may be more readily removed from the work area. In other words, the solutions have been directed primarily to a form of the chip produced, rather than removal of the chip from the work area.

SUMMARY OF THE INVENTION

The present invention is directed to a reduction of the inherent deficiencies in conventional milling cutters by the provision, not only of a discontinuous cutting edge adapted to produce an improved cutting action as well as discontinuous chips, but also of tooth cutting face and trailing face surfaces which facilitate production of chips of a desirable shape and the removal of such chips from the work area. In its broadest aspect, the invention contemplates a rotary cutting tool blank comprising a cutting portion having a longitudinal axis and a plurality of teeth extending the length of said cutting portion, with each of the teeth having a cutting face and a trailing face and land surface bridging the cutting and trailing faces. The land surface is interrupted by a plurality of spaced transverse depressions of relatively large radius arcuate cross section to form a plurality of cutting edge portions at the junction of the cutting face and the uninterrupted portions of the land surface. The cutting edge portions have a positive rake angle, and the trailing and cutting faces of each tooth have surfaces which undulate generally sinusoidally from one end of the cutting portion to the other so that the rake angle of each cutting edge portion varies continuously along its length. The cutting tool blank can of course be transformed to a cutting tool ready for use simply by suitably relieving the land surfaces to form cutting edges at the aforementioned cutting edge portions.

The transverse depressions formed in the land surfaces results in interrupted cutting edges which create relatively small, discontinuous chips, even with a heavy cut. This tends to alleviate the load on the cutting edges of the tool and therefore tends to reduce tool wear. Further, the variable rake angle of the cutting edges facilitates production of a chip which, in conjunction with the sinusoidally undulating cutting and trailing face tooth surfaces, tends to remove itself from the work area. Also of importance, the tool is relatively simple to produce and may be sharpened with equipment suitable for sharpening a conventional cutting tool of the same type, so that a user may re-sharpen the tools without resort to costly or specialized equipment, and without the necessity of returning the tool to the manufacturer or to someone having specialized equipment for sharpening or re-sharpening.

The foregoing advantages, together with others, will be explained more fully in the following detailed description of the invention with reference to the accompanying drawings.

DESCRIPTION OF THE PREFERRED EMBODIMENT

Figure 1:
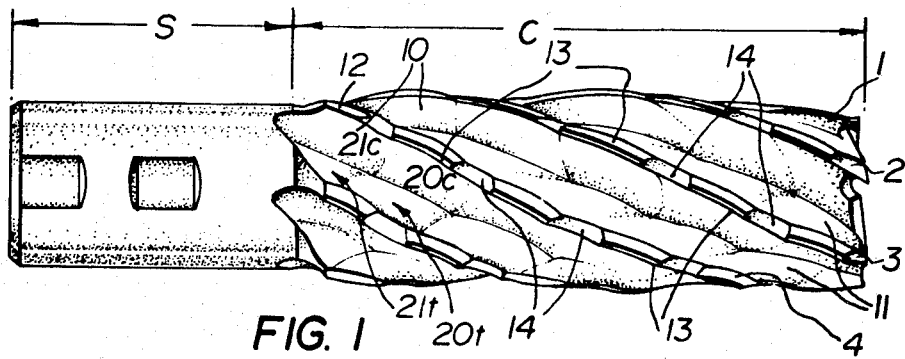
FIG. 1 is a side view of an end mill in accordance with the invention.

For a better understanding of the present invention, it will be useful to briefly describe the manner in which a conventional cylindrical or straight-sided end mill with helically arranged teeth and cutting edges is formed. Starting with a cylindrical blank, the shank portion and the cutting portion of the tool are turned to the proper diameter on a lathe. A plurality of flutes are then spirally formed in the cutting portion of the tool by means of a special flute mill which is so shaped as to form the cutting face of one tooth and the trailing face and land surface of an adjacent tooth in a single pass in which the flute mill is moved along a predetermined spiral path over the surface of the cutting portion from one end to the other. Normally the flute mill will be so shaped that the cutting edge portion or cutting edge of each tooth will have a positive radial rake angle, by which is meant the angle subtended by an extension of the tooth cutting face at the cutting edge, and a radial line passing through the cutting edge in a plane perpendicular to the longitudinal axis of the tool will be less than 180°. In the conventional milling cutter, this rake angle will be constant throughout the length of the tooth. After milling, the blank so formed is suitably hardened and the shank portion is ground followed by grinding of the land surfaces of the teeth to form a primary clearance and secondary clearance (which step is referred to as "relieving") to form cutting edges along each tooth at the junction of the cutting face and the land surface. Cylindrical grinding apparatus is conventionally used for these grinding steps.

All of the foregoing steps are conventional and are routinely carried out in the production of conventional milling cutters. The principle difference between the manner of producing a conventional cutter as described above, an the manner of producing the cutter of the present invention arises when the flute mill is applied to the cutting portion of the cylindrical blank to form the teeth. In the production of the milling cutter of the present invention, a template is used which, as the fluting mill is moved along a spiral path from one end of the cutting portion to the other, causes the flute mill to move alternatively toward and away from the longitudinal axis of the tool to be formed along an undulating or sinusoidal path. Accordingly, when the flute mill is moved toward the longitudinal axis of the cutting tool to be formed, concave depressions will simultaneously be formed in the cutting face of one tooth and the trailing face and land surface of the adjacent tooth. As the flute mill is moved away from the longitudinal axis of the cutting tool to be formed, a convex surface will be simultaneously formed in the cutting face of one tooth and the trailing face of the adjacent tooth. However, that portion of the flute mill which would normally follow the land surface of the adjacent tooth in production of a conventional end mill, is moved entirely off the cutting portion surface with the result that the land surface is uneffected by the fluting mill and, in this area, will correspond to the lathe formed outer surface of the cutting portion formed from the original cylindrical blank. All the teeth will be formed in sequence around the periphery of the cutting portion in a similar manner, so that each tooth will have a cutting face and a trailing face with surfaces which undulate generally sinusoidally from one end to the other and a land surface which will follow the lathe turned surface of the original cylindrical blank, interrupted by a plurality of relatively shallow transverse depressions of relatively large radius arcuate cross section where the relevant portion of the flute mill has cut into the land surface during that portion of the sinusoidal movement of the flute mill disposed toward the axis of the cutting tool to be formed.

As a practical matter, the movement of the flute mill toward and away from the axis of the cutting tool to be formed will start at successively different points along the template as teeth are formed sequentially about the cylindrical surface of the cutting portion. As a result, the transverse depressions formed in the tooth land surfaces sequentially about the periphery of the tool to be formed, and consequently the cutting edge portions of the teeth, will be displaced axially, or be slightly out of phase with respect to the adjacent teeth.

Apart from the use of an undulating or sinusoidally formed template to provide motion for the flute mill toward and away from the axis of the cutting tool to be formed, the formation of the cutting tool of this invention is precisely the same as the formation of a conventional end mill and conventional equipment may be employed in the usual steps to complete all other aspects of the milling cutter including the relieving of the land surfaces to form cutting edges which, in the case of the tool of the invention, will be formed on only those uninterrupted portions of the land surfaces which lie between the spaced depressions.

Figure 2:
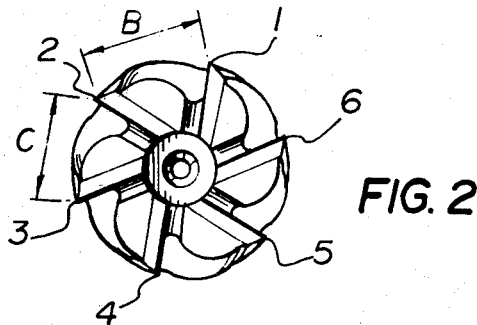
FIG. 2 is an end view of the end mill of FIG. 1.
Figure 3:
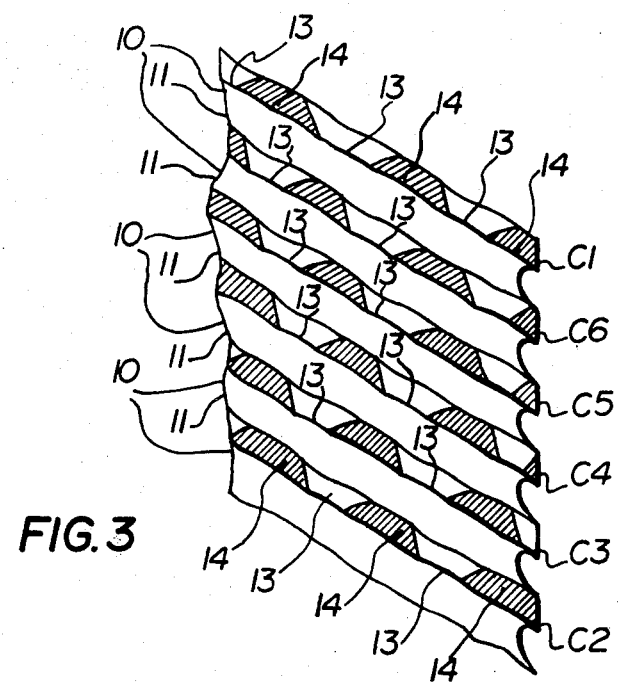
FIG. 3 is a development of the cutting portion of the end mill of FIG. 1.
Figure 6:
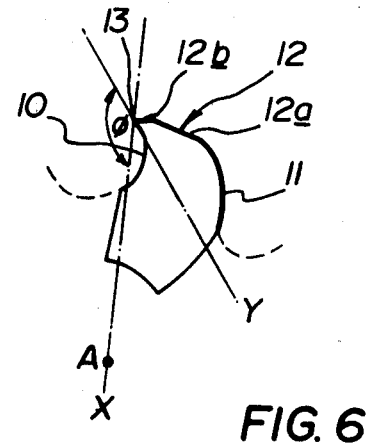
FIG. 6 is an enlarged transverse section of a typical tooth.

Referring now in detail to the drawings, with particular reference to FIGS. 1 and 2, a rotary cutting tool in the form of a milling cutter is shown having a shank portion S and a cutting portion C. In the particular milling cutter illustrated, the cutting portion is provided with 6 teeth designated 1 through 6 which extend in a parallel spiral arrangement from the shank end of the cutting portion to the free end of the cutting portion. As best illustrated in FIG. 6, each tooth comprises a cutting face 10, a trailing face 11 and a land surface 12 bridging the cutting and trailing faces. The tooth illustrated in FIG. 6 has been cylindrically ground to relieve the land surface and form a cutting edge 13. The relieving of the land surface is accomplished by first grinding the land surface to provide a slope or secondary clearance running from the cutting face 10 to the trailing face 11, which secondary clearance is designated 12a in the drawing, and then grinding off the edge at the cutting face to produce a primary clearance 12b.

Figure 4:
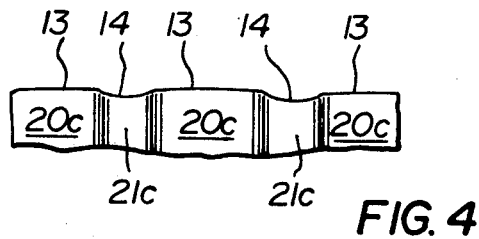
FIG. 4 is a side view of a length of cutting edge of a typical tooth.
Figure 5:
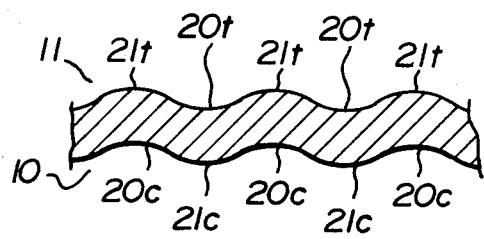
FIG. 5 is a longitudinal section through the middle of a length of tooth corresponding to FIG. 4.

As will be seen in FIG. 6, the dash/dot line X running through the longitudinal axis A of the cutting tool and the cutting edge of the illustrated tooth, and the dash/dot line Y representing the slope of cutting face 10 at the cutting edge, subtend angle $\phi$ of less than 180° which, as the expression will be used throughout this specification, means that the cutting edge has a positive rake angle or positive radial rake relationship with the longitudinal cutting tool axis. Each land surface is interrupted by a plurality of spaced transverse depressions 14 which, as best seen in FIG. 4, are relatively shallow and are of relatively large radius arcuate cross section. The effect of the plurality of spaced depressions formed in each of the land surfaces is to create a plurality of cutting edges 13 on each tooth formed at the intersection of the cutting face and the uninterrupted portions of the land surface. It will also be seen, as best illustrated in FIG. 5, that the trailing face and cutting face of each tooth are provided with undulating surfaces which, when viewed in section, resemble a sinusoidal curve. In other words, the cutting face and trailing face surfaces continously alternate between concave and convex or vice versa from one end of the cutting portion to the other. In the drawings, the concave portions of the cutting face surfaces are designated 20c and the convex portions of the cutting face surfaces are designated 21c, whereas the concave portions of the trailing face surface are designated 20t and the convex portions of the trailing face surfaces are designated 21t. Of course, as the cutting face surface of one tooth and the trailing face surface of the adjacent tooth are formed simultaneously by means of a flute mill, as hereinbefore described, the respective convex and concave portions will be in alignment. Preferably, the concave portions of a cutting face surface will be aligned with the cutting edges, as illustrated in FIG. 4, and the convex portions of the cutting face will be aligned with the transverse depressions 14. This relationship can be readily achieved by suitable disposition of the template which governs each longitudinal pass of the flute mill as previously described.

The production of a milling cutter in accordance with the foregoing description gives rise to a number of advantages which manifest themselves in superior performance, very satisfactory wear characteristics, ease of manufacture and relatively simple maintenance. The latter arises because the cutting tool of the invention, while being of rather unusual form, may nevertheless be sharpened with conventional equipment which would normally be available at any machine shop in which the cutting tool is used.

As described previously in considerable detail, the method of constructing a cutting tool in accordance with this invention is precisely the same as the method of constructing a conventional cutting tool, such as a conventional end mill with one exception. In constructing an end mill in accordance with the present invention, a template is used to guide the flute mill along a sinusoidal path to simultaneously produce undulating cutting face and trailing face surfaces on adjacent teeth, and to produce spaced transverse depressions in the land surface of the tooth associated with the trailing face. This represents the only departure from the method of constructing a conventional end mill. However, this angle departure, gives rise to a number of desirable features in the finished cutting tool. For example, the plurality of transverse depressions in the land surfaces (which are not to be confused with a relatively deep or small radius "chip breaker" grooves which are known in the prior art) give rise to an interrupted cutting edge which, as explained previously, tends to reduce tool wear. Further, the sinusoidally undulating surface of the cutting face of each tooth gives rise to a rake angle at each cutting edge which varies continuously along the length of the cutting edge, and this facilitates the formation of relatively small chips which are so configured, that the chips taper from a relatively thick central portion to a relatively fine point at either end resembling the cross section of a double convex lens. Additionally, the space for curling of the chip is reduced where the cutting and trailing face surfaces are convex, with the result that the chips tend to be squeezed at these areas and tend to spring away from the work piece and the cutting tool when free to do so, in this way facilitating chip removal. As indicated previously, in a preferred arrangement, each cutting edge will be adjacent a concavity in the cutting face surface so that the end of each cutting edge 13 will be adjacent the points at which the cutting face surface changes from concave to convex. In this embodiment, the rake of each cutting edge will be greatest towards its centre (where the concavity in the cutting face surface reaches its deepest point) and will be least toward each end (where the concavity is least or virtually non-existent) and such relationship tends to be ideal for both the production of a lense shaped chip, and for the pinching of the ends of the chip to enhance removal of the chip from the work area by the spring action referred to above.

Another direct result of the offset undulating cutting face surfaces formed in the teeth is that the distance from cutting edge to cutting edge of adjacent teeth in any given plane transverse to the axis of the tool will be different between different pairs of teeth. For example, referring to FIG. 2 which represents one view of the tool in a transverse plane which corresponds to the free end of the cutting portion of the tool, any distance between the cutting edges of teeth 1 and 2 shown as B, will be different from the distance between the cutting edges of teeth 2 and 3, shown as C. This irregular spacing of the cutting edges tends to avoid cyclical vibrations during the cutting operation because the cutting edges are not entering and leaving the work piece at equal intervals of time as would be the case if the cutting edges were uniformly spaced, as is the case with conventional end mills.

It is, of course, to be understood that the present invention is, by no means, limited to the particular construction shown in the drawing, but also comprises any modifications within the scope of the appended claims. For example, as previously noted, the invention has been shown in conjunction with a spirally fluted end mill. However, the invention may also be useful with other forms of end mills such as a straight fluted end mill or a tapered end mill, and, indeed, may be applicable to other types of rotary cutting tools. Further, it will be appreciated that such cutting tools may vary considerably in diameter and size, and that the depth of cut of the flute mill employed during construction of the cutting tool may vary considerably depending upon the desired cutting edge or rake angle. For example, the deeper the cut taken by the fluting mill, the greater will be the rake of the cutting edges, and the appropriate rake angle will of course depend upon many factors within the knowledge of the machinist and the tool manufacturer.

What I claim as my invention is:

1. A rotary cutting tool comprising a cutting portion having a longitudinal axis and a plurality of teeth extending the length of said cutting portion, each of said teeth having a cutting face and a trailing face and a relieved land surface bridging said two faces, said relieved land surface being interrupted by a plurality of spaced transverse depressions of relatively large radius arcuate cross section to form a plurality of cutting edges at the junction of said cutting face and the uninterrupted portions of said land surface, said cutting edges having a positive rake angle, and said trailing and cutting faces having surfaces which undulate generally sinusoidally from one end of said cutting portion to the other, whereby the rake angle of each cutting edge varies continuously along its length.

2. A rotary cutting tool as defined in claim 1, wherein said cutting portion is cylindrical in form, and said teeth are disposed helically thereon in parallel relationship to one another.

3. A rotary cutting tool as defined in claim 2, wherein the helix angle of said teeth with respect to said axis is 30°.

4. A rotary cutting tool as defined in claim 1, wherein the cutting edges of each tooth are displaced axially with respect to the cutting edges of the remaining teeth.

5. A rotary cutting tool as defined in claim 4, wherein each cutting edge of each tooth lies opposite a concavity on the undulating surfaces of its cutting face and the adjacent trailing face of the preceding tooth in the intended direction of rotation of the tool.

6. A rotary cutting tool as defined in claim 4, wherein the distances between cutting edges of adjacent teeth, in a plane perpendicular to said axis is variable.

7. A rotary cutting tool as defined in claim 1, 2 or 4, wherein said tool is an end mill and includes a shank portion.

8. A rotary cutting tool blank comprising a cutting portion having a longitudinal axis and a plurality of teeth extending the length of said cutting portion, each of said teeth having a cutting face and a trailing face and a land surface bridging said two faces, said land surface being interrupted by a plurality of spaced transverse depressions of relatively large radius arcuate cross section to form a plurality of cutting edge portions at the junction of said cutting face and the uninterrupted portions of said land surface, said cutting edge portions having a positive radial rake relationship with said axis, and said trailing and cutting faces having surfaces which undulate generally sinusoidally from one end of said cutting portion to the other, whereby the radial rake relationship of each cutting edge portion varies continuously along its length.

9. A rotary cutting tool blank as defined in claim 8, wherein said cutting portion is cylindrical in form, and said teeth are disposed helically thereon in parallel relationship to one another.

10. A rotary cutting tool blank as defined in claim 9, wherein the helix angle of said teeth with respect to said axis is 30°.

11. A rotary cutting tool blank as defined in claim 8, wherein the cutting edge portions of each tooth are displaced axially with respect to the cutting edge portions of the remaining teeth.

12. A rotary cutting tool blank as defined in claim 11, wherein each cutting edge portion of each tooth lies opposite a concavity on the undulating surfaces of its cutting face and the adjacent trailing face of the preceding tooth in the intended direction of rotation of the tool.

* * * * *